(12) United States Patent
Meylan et al.

(10) Patent No.: US 8,619,684 B2
(45) Date of Patent: Dec. 31, 2013

(54) METHOD AND APPARATUS FOR DOWNLINK DATA ARRIVAL

(75) Inventors: Arnaud Meylan, Bois-Colombes (FR);
Juan Montojo, San Diego, CA (US);
Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 12/433,636

(22) Filed: Apr. 30, 2009

(65) Prior Publication Data

US 2009/0274077 A1 Nov. 5, 2009

Related U.S. Application Data

(60) Provisional application No. 61/049,714, filed on May 1, 2008.

(51) Int. Cl.
*H04W 72/04* (2009.01)
*H04J 3/16* (2006.01)
*H04J 3/00* (2006.01)

(52) U.S. Cl.
USPC ........... 370/329; 370/466; 370/390; 370/280; 370/312; 370/432; 455/450

(58) Field of Classification Search
USPC ......... 370/280, 328, 329–332, 390, 335, 311, 370/350, 503, 465–466, 342–343; 455/450
See application file for complete search history.

(56) References Cited

U.S. PATENT DOCUMENTS

| | | | | |
|---|---|---|---|---|
| 6,483,852 | B1 * | 11/2002 | Jacquet et al. | 370/466 |
| 6,553,021 | B1 * | 4/2003 | Bishop et al. | 370/347 |
| 7,756,074 | B2 * | 7/2010 | Beckmann et al. | 370/328 |
| 7,817,534 | B2 * | 10/2010 | Burbidge et al. | 370/212 |
| 7,852,826 | B2 * | 12/2010 | Kitchin | 370/349 |
| 8,000,314 | B2 * | 8/2011 | Brownrigg et al. | 370/351 |
| 8,116,389 | B2 * | 2/2012 | Nakao | 375/260 |
| 8,155,701 | B2 * | 4/2012 | Balachandran et al. | 455/561 |
| 2002/0137459 | A1 * | 9/2002 | Ebata et al. | 455/16 |
| 2003/0104816 | A1 * | 6/2003 | Duplessis et al. | 455/448 |
| 2004/0165547 | A1 | 8/2004 | Lopes | |

(Continued)

FOREIGN PATENT DOCUMENTS

| | | |
|---|---|---|
| CN | 1906896 A | 1/2007 |
| CN | 1941687 A | 4/2007 |

(Continued)

OTHER PUBLICATIONS

"Details on PDCCH for DL data arrival", 3GPP TSG-RAN WG1 #53, R1-081978, May 5-9, 2008, Kansas City, USA.

(Continued)

*Primary Examiner* — Candal Elpenord
(74) *Attorney, Agent, or Firm* — Nerrie M. Zohn

(57) ABSTRACT

A method is provided to generate messages for wireless communications. The method includes encapsulating a first message protocol within the framework of a second message protocol and generating a message from the first message protocol and the second message protocol. The method transmits the first message protocol to an allocation space designated for the second message protocol.

19 Claims, 11 Drawing Sheets

(56) References Cited

U.S. PATENT DOCUMENTS

| | | |
|---|---|---|
| 2005/0254467 A1* | 11/2005 | Li et al. .................. 370/335 |
| 2006/0165031 A1 | 7/2006 | Wang et al. |
| 2006/0239265 A1* | 10/2006 | Son et al. ................. 370/390 |
| 2007/0211669 A1* | 9/2007 | Umatt et al. .............. 370/335 |
| 2007/0230351 A1* | 10/2007 | Dang ....................... 370/236 |
| 2007/0254656 A1* | 11/2007 | Dalsgaard ................ 455/435.1 |
| 2008/0031245 A1 | 2/2008 | Pekonen |
| 2008/0095195 A1* | 4/2008 | Ahmadi et al. ........... 370/478 |
| 2008/0243901 A1* | 10/2008 | Super et al. .............. 707/102 |
| 2008/0267105 A1* | 10/2008 | Wang et al. .............. 370/311 |
| 2009/0067377 A1* | 3/2009 | Talukdar et al. ......... 370/329 |
| 2009/0116427 A1* | 5/2009 | Marks et al. ............. 370/328 |
| 2009/0144470 A1* | 6/2009 | Perrot et al. .............. 710/105 |
| 2009/0238091 A1* | 9/2009 | Kim et al. ................ 370/252 |
| 2010/0027446 A1* | 2/2010 | Choi et al. ............... 370/280 |
| 2010/0172278 A1 | 7/2010 | Nishio et al. |
| 2011/0032891 A1* | 2/2011 | Lee et al. ................. 370/329 |

FOREIGN PATENT DOCUMENTS

| | | |
|---|---|---|
| EP | 1683286 A2 | 7/2006 |
| EP | 1940060 A1 | 7/2008 |
| JP | 2007520121 A | 7/2007 |
| KR | 20060107771 A | 10/2006 |
| WO | 2005069547 A1 | 7/2005 |
| WO | WO2007024098 A1 | 3/2007 |
| WO | WO2007036116 A1 | 4/2007 |
| WO | 2007083636 A1 | 7/2007 |
| WO | WO2008042723 A1 | 4/2008 |

OTHER PUBLICATIONS

Taiwan Search Report—TW098114658—TIPO—May 16, 2012.
International search report and Written Opinion—PCT/US2009/042631, International Search Authority—European Patent Office—Sep. 15, 2009.

* cited by examiner

METHOD AND APPARATUS FOR DOWNLINK DATA ARRIVAL

CROSS REFERENCE TO RELATED APPLICATIONS

This application claims the benefit of U.S. Provisional Patent Application No. 61/049,714, entitled A METHOD AND APPARATUS FOR FORMATTING PDCCH FOR DOWNLINK DATA, and filed on May 1, 2008, the entirety of which is incorporated herein by reference.

BACKGROUND

I. Field

The following description relates generally to wireless communications systems, and more particularly to generation of control messages without employing additional control elements within existing messages.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple (NF) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the NF frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Generally, each of the NS independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

One common communications application involves the requirement for base stations to communicate data to multiple user equipment or devices, where the devices have limited resources for decoding messages and processing overhead. Typically, a subframe is transmitted that has control information along with message data. To avoid having to send out extraordinarily long subframes that can uniquely identify each device, a search space is designated where a subset of devices can employ the space for communications with the base station. To avoid collisions within the search space, devices are offset from each other in the space and along with other encoding such as cyclic redundancy checks (CRC), orderly communications can proceed. One application requirement is for the base station to be able to transmit data across a downlink channel to the devices. With present communications protocols and the limited number of control bits utilized for synchronization, it is not feasible to add additional bits to the protocol if other types of control operations become necessary.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods are provided to generate control messages between base stations and devices without employing additional bits to signal such control. In one aspect, a first message protocol such as a unicast message is encapsulated within the framework or context of a second protocol such as a common broadcast protocol. The unicast message is sent to a search space on user equipment (UE) or the device that is generally reserved for the common broadcast messages. By directing the unicast or UE-specific message to the common space of the device, this acts as a control signal for the device to perform substantially any desired operation. In one example, the device when sensing the unicast message in the common search space performs a resynchronization operation with the base station. After resynchronization, data can be transmitted on a downlink channel to the device. In a similar aspect, the second protocol can wrap the first protocol. For example, the unicast protocol can be employed to transport a common broadcast message. Thus, systems and methods are provided where a message format that is normally utilized as a broadcast message, for example, and sent within a common search space is being sent as a unicast message in a UE-specific search space; thus creating a virtual new unicast message type. As noted, this process can also be provided in the inverse direction, where a message format that is normally utilized as a unicast message and sent within the UE-specific search space is being sent as a broadcast message in the common search space, thus creating a virtual new broadcast message type. In either aspect, the set of control messages can be expanded without increasing existing message sizes.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided to generate control messages without allocating additional bits to signal such control. In one aspect, a method is provided to generate messages for wireless communications. The method includes encapsulating a first message protocol within the framework of a second message protocol and generating a message from the first message protocol and the second message protocol. The method transmits the first message protocol to an allocation space designated for the second message protocol. In one aspect, the first message protocol is associated with a user equipment specific search space and the second message protocol is associated with a common search space. In another aspect, the first message protocol is associated with a common search space and the second message protocol is associated with a user equipment specific search space.

Figure 1:
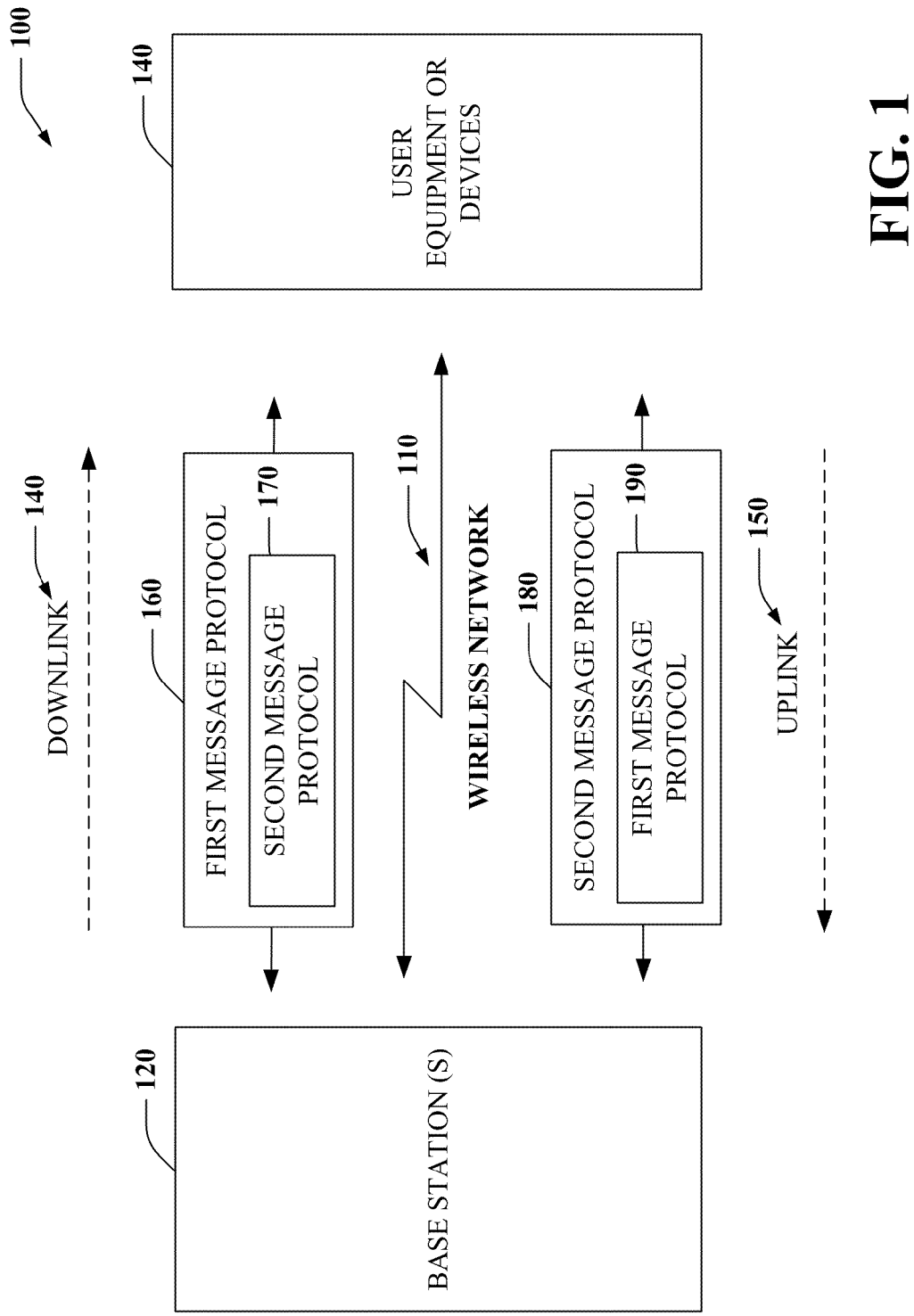
FIG. 1 is a high level block diagram of a system that employs encapsulation protocols to facilitate signaling and control between nodes of a wireless system.

Referring now to FIG. 1, encapsulation protocols are employed to facilitate signaling and control between nodes of a wireless system 100. The system 100 includes one or more base stations 120 (also referred to as a node, evolved node B-eNB) which can be an entity capable of communication over a wireless network 110 to a second device 130 (or devices). For instance, each device 130 can be an access terminal (also referred to as terminal, user equipment, mobility management entity (MME) or mobile device). The base station 120 communicates to the device 130 via downlink 140 and receives data via uplink 150. Such designation as uplink and downlink is arbitrary as the device 130 can also transmit data via downlink and receive data via uplink channels. It is noted that although two components 120 and 130 are shown, that more than two components can be employed on the network 110, where such additional components can also be adapted for the encapsulation protocols described herein. In one aspect, a first message protocol 160 encapsulates or transports a second message protocol 170 and is sent to the device 130 to facilitate control or signaling to the device without having to increase existing message sizes. In another aspect, the second message protocol shown at 180 can be employed to encapsulate or transport the first message protocol shown at 190. Although only two degrees or levels of encapsulation are depicted at 160 and 180 respectively, it is to be appreciated that nested levels of communications protocols could also be generated.

In general, methods are provided to generate control messages between base stations 120 and 130 devices without employing additional bits to signal such control. In one aspect, the first message protocol 160 such as a unicast message is encapsulated within the framework or context of a second protocol 170 such as a common broadcast protocol. The unicast message 160 is sent in a search space to user equipment (UE) or the device 130 that is generally reserved for the common broadcast messages. By directing the unicast or UE-specific message 160 to the common space of the device 130, this acts as a control signal for the device to perform substantially any desired operation. In one example, the device when sensing the unicast message in the common search space performs a resynchronization operation with the base station 120. After resynchronization, data (e.g., audio, video, files, images, and so forth) can be transmitted on the downlink channel 140 to the device 130.

In a similar aspect, the second protocol 180 can wrap the first protocol 190. For example, the unicast protocol can be employed to transport a common broadcast message. Thus, systems and methods are provided where a message format that is normally utilized as a broadcast message, for example and sent within a common search space is being sent as a unicast message in a UE-specific search space, thus creating a virtual new unicast message type. As noted, this process can also be provided in the inverse direction, where a message format that is normally utilized as a unicast message and sent within the UE-specific search space is being sent as a broadcast message in the common search space, thus creating a virtual new broadcast message type. In either aspect, the normal set of control messages can be expanded without increasing existing message sizes.

In general, broad methods are provided to generate messages for wireless communications. This includes encapsulating a first message protocol within the framework of a second message protocol and generating a message (or messages) from the first message protocol and the second message protocol. The method also includes transmitting the first message protocol to an allocation space designated for the second message protocol. The first message protocol 160 or 190 can be associated with a user equipment specific search space and the second message protocol 170 or 180 can be associated with a common search space. In another aspect, the first message protocol 160 or 190 can be associated with a common search space and the second message protocol 170 or 180 can be associated with a user equipment specific search space.

Messages can be generated from the first and second protocols, where the message is employed to signal an operation between base station 120 and user equipment or device 130 without using an additional bit as the signal. In one specific example, the operation can be a resynchronization between the base station 120 and user equipment 130 although substantially any type of control can be designated. The message can be transmitted as part of a Physical Downlink Control Channel (PDCCH) protocol and generated to indicate that downlink data is ready to be sent from the base station 120 to user equipment 130. In some examples, the message can include an access preamble and an allocated time location for frequency division duplex (FDD) and time division duplex (TDD). This can also include an allocated frequency location for TDD. Also, the message can include an allocated offset to an initial transmission power. The methods can perform a contention free access or a contention-based random access via the respective messages. Furthermore, the message can include a broadcast control channel field and one or more resource blocks for additional processing. The message can include a random access channel field and a paging field in addition to other fields.

It is noted that the system 100 can be employed with an access terminal or mobile device, and can be, for instance, a module such as an SD card, a network card, a wireless network card, a computer (including laptops, desktops, personal digital assistants (PDAs)), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
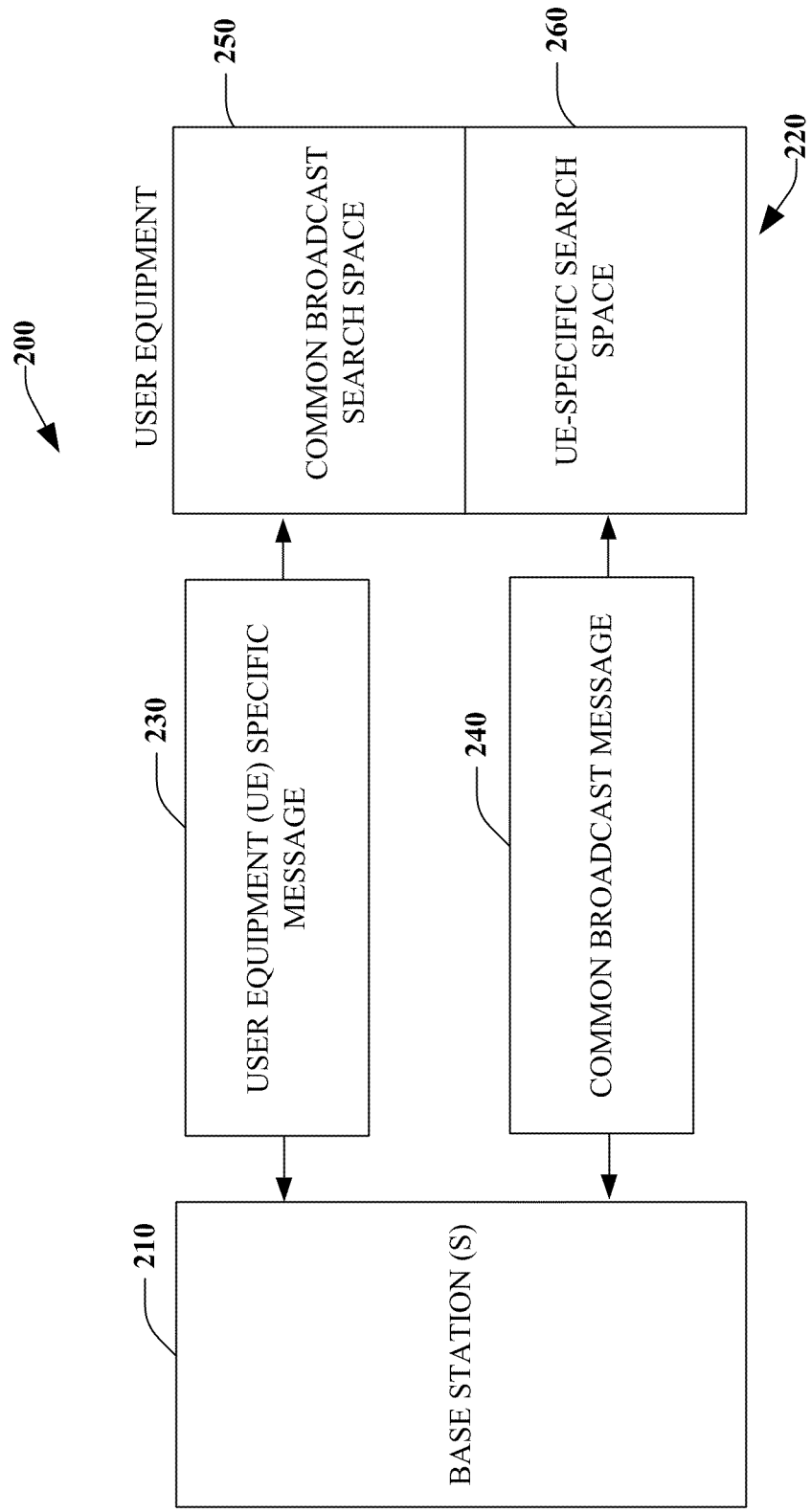
FIG. 2 is a signal diagram that illustrates communication of encapsulated protocols for message signaling.

Turning to FIG. 2, a system 200 illustrates communication of encapsulated protocols for message signaling. As shown, a base station 210 communicates with user equipment 220 via a user equipment (UE) specific message 230 or a common broadcast message 240. The user equipment 220 is segmented and two portions are shown as a common broadcast search space 250 and a UE-specific search space 260. Note how the UE-Specific messages 230 are cross-coupled into search space 250 that is normally designated for common broadcast messages. Similarly, common broadcast messages 240 can be cross-coupled into UE-Specific space 260. By coupling message in this manner, it is possible for the base station 210 to signal the user equipment 220 to perform a designated operation. This is achieved without adding additional control bits to either the UE-Specific message 230 or the common broadcast message 240. The presence of an alternative message type or protocol appearing in the common broadcast search space 250 or the UE-Specific search space 260 is a signal to the user equipment to perform a given or predetermined operation. As noted previously, in one example, the cross-coupling of messages may be a signal for the UE 220 to perform a resynchronization operation with the base station 210. When the base station 210 and UE are synchronized, data transfer can occur across a designated downlink channel if desired. As can be appreciated, a plurality of differing operations can be defined that are respectively triggered by the cross-coupling of messages and search space.

The UE-Specific search space and the common search space may not be distinct at all times. In order to efficiently utilize the available control channel resources, the UE-Specific search space may be reassigned in different segments of the total available control resource space in a time varying pseudo-random manner. Depending on the implementation of such randomization, a partial or full overlap of the UE-Specific search space and the common search space can occur occasionally. With appropriate design, the frequency of occurrence of those overlaps can be limited. Since UE-Specific message types and common broadcast message types are distinguishable by the type of CRC scrambling used, the search space overlaps do not normally cause message type confusion. This is not the case, however, when the same CRC scrambling is used for two different message types, and cross-coupling, e.g., UE-Specific messages 230 cross-coupled into search space 250, or common broadcast messages 240 cross-coupled into UE-Specific space 260, is used to differentiate the message types. In these cases, an overlap of the UE-Specific search space and the common search space could cause a message type ambiguity. The occurrence of these conditions is well known to the base station 120, so the base station can refrain from sending cross-coupled messages when search space overlap occurs, in order to preempt message ambiguity. The incurred cost can be an occasional few milliseconds of messaging delay. The need for delaying cross-coupled messages can be reduced by adaptively selecting an appropriate control aggregation level and control channel element (CCE) start position since the UE-Specific search space is aggregation level dependent, so often it is possible to find an aggregation level in which full overlap does not occur.

Figure 3:
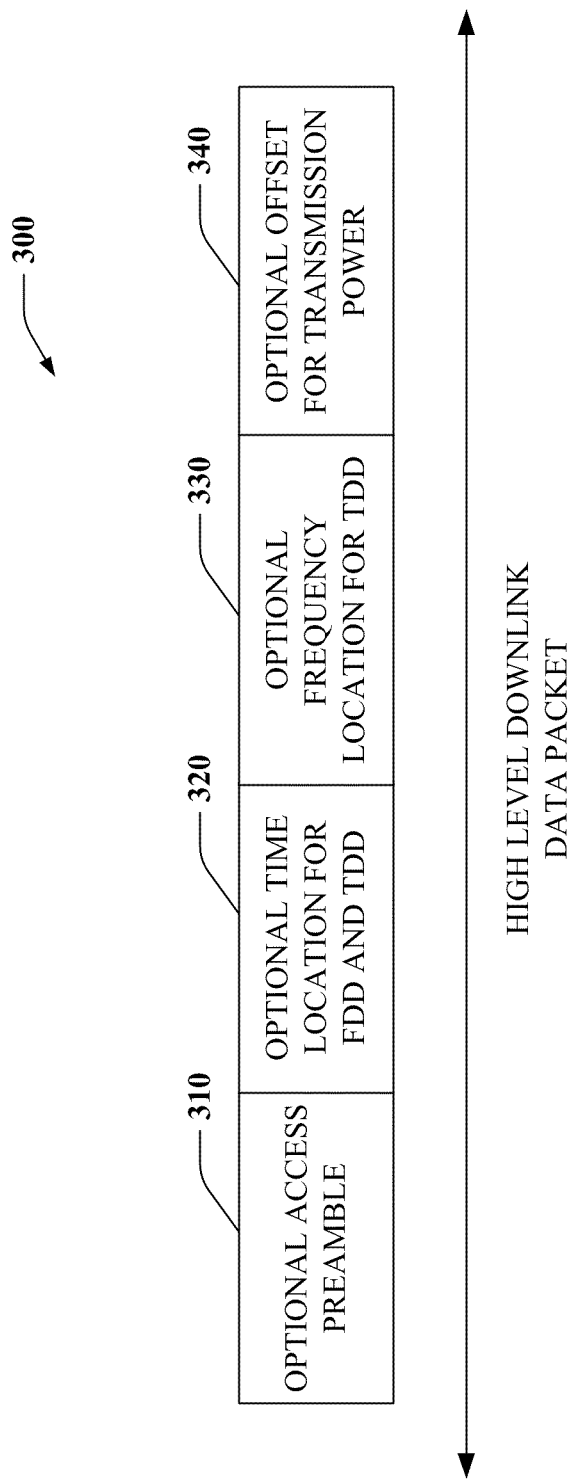
FIG. 3 illustrates an example downlink format for wireless communications.

Referring to FIG. 3, an example downlink format packet 300 is illustrated for wireless communications. Various specifications that are readily available on the Internet and otherwise provide formats such as specified by 3GPP RAN2 that specifies a physical data control channel (PDCCH) to trigger a UE to perform Random Access procedures when the UE does not have timing synchronization, this scenario is also referred to as "downlink (DL) data arrival." For purposes of brevity, various acronyms are employed with respect to the description of FIGS. 3 and 4 which are defined at the end of the specification. One aspect of DL is which PDCCH format to use. Various PDCCH formats including formats 1, 1A, 1B, 1C, 2, 3, 3A are defined by RAN1 which is readily available, where some formats have a size dependent on system bandwidth, and some do not.

In particular format 1C's size is fixed for all system bandwidth. For DL data arrival, various information is to be conveyed to the UE with the PDCCH including:

At 310, optionally allocated dedicated Access Preamble (6 bits)

At 320, optionally allocated Time location for FDD and TDD (2 bits)

At 330, optionally allocated Frequency location for TDD (x bits)

At 340, optionally allocated Offset to the initial transmission power (3 bits)

When the above data is indicated, the UE performs a contention free access, and if not it performs a contention-based random access. Format 1C (described below in FIG. 4) is selected in order to carry the above information. In general, format 1C is designed to indicate downlink transmissions on PDSCH, that carry transport channels including the Paging Channel, Broadcast Channel, System Information change channel and Random Access Response Channel. The transport channel is indicated by masking its ID (RNTI) on the CRC of the PDCCH. Respectively, the PI-RNTI, SI-RNTI, SC-RNTI and RA-RNTI can be used.

The fields nominally available in PDCCH format 1C are used to signal a downlink shared channel transmission and are sometimes not as useful for DL data arrival. Instead the fields mentioned above are indicated (access preamble, time and frequency location, power offset). Hence, format 1C may contain two sets of fields, one for DL data arrival and one to indicate PDSCH transmissions.

One aspect includes relying on the ID masked on the CRC to distinguish which set of field is contained in the PDCCH format:
- if the UE IE (C-RNTI) is masked onto the CRC, the PDCCH indicates DL data arrival
- if the PI-RNTI, SI-RNTI, SC-RNTI and RA-RNTI is masked onto the CRC, the PDCCH indicates a PDSCH transmission.

The PDCCH search space can be partitioned into common and the UE specific. Format 1C is currently available in the Common space. In order to increase the flexibility of PDCCH scheduling, it is beneficial to include format 1C in the UE specific search space as well. However, that can increase the size of the search space and hence UE complexity for PDCCH processing. The format 1C in the UE specific search space can be used if the UE is out of sync (hence DL data arrival scenario may occur). When the UE is in sync, regular PDSCH or PUSCH transmissions can occur.

When the UE is in sync it does not need to search for format 1C in the UE specific search space. When UE is out of sync, it can search for format 1C in this example in the UE-specific search space. In general, the UE considers itself time-synchronized when a Timing Advance Timer (TAT) is running. The TAT is restarted when a Timing Advance Command (TAC) is received. Since the TAC may be lost, the eNb may consider the UE in sync, while the UE may consider itself out of sync. In that case, the UE may search for format 1C in the UE-specific search space, and miss the PDCCH indicating PDSCH or PUSCH transmissions. Instead, the UE can deem itself out of sync by introducing a signal for eNB to indicate "considered out of sync" to specific UE. If such signaling is made reliable, the UE and eNB have the same view on time-synchronization and it is safe for the UE to adapt its PDCCH search space based on timing synchronization.

Figure 4:
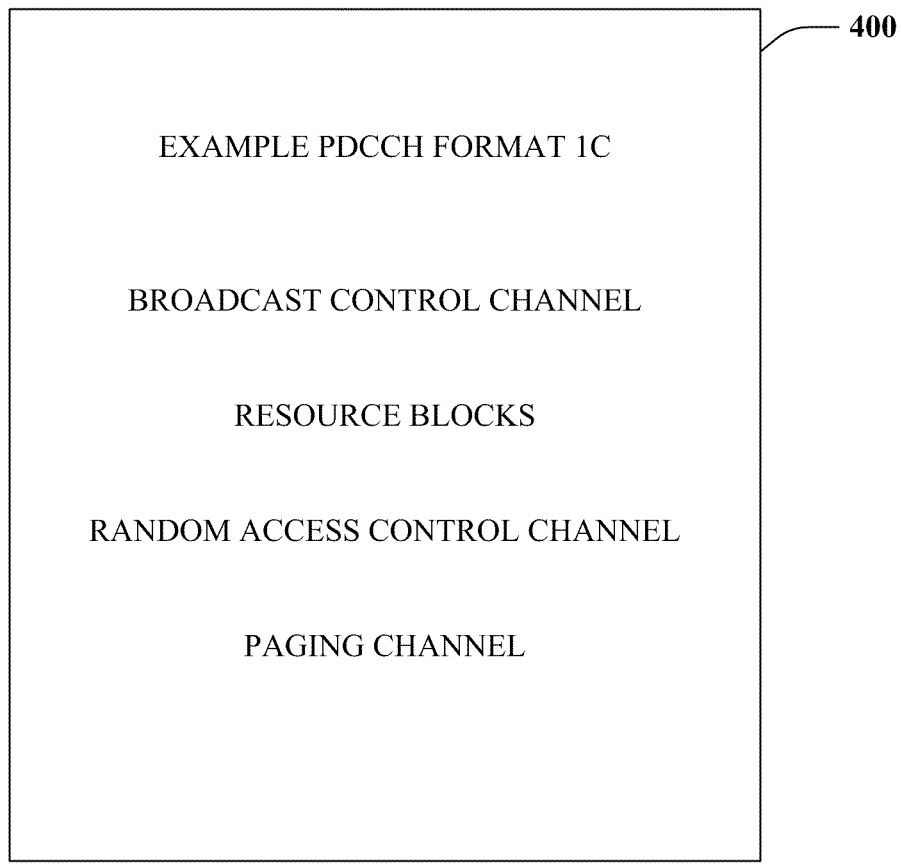
FIG. 4 illustrates an example PDCCH format for downlink data arrival.

Referring to FIG. 4, an example PDCCH format packet 1C 400 is illustrated for downlink data arrival. The PDCCH format 1C for transmission of BCCH, RACH Response and Paging can include:
- Use QPSK on related PDSCH transmission
- Contents
- 16 bits RNTI/CRC
- 3 bits MCS
- 5 bits RB assignment
- 2 bits RSN The data format 400 can include a broadcast channel (BCCH). For BCCH, the smallest size would typically be 250~350 bits for SI-1. The maximum size proposed is around 1200 bits. Further, on the handling of ETWS where the payload size is up to 9840 bits and applies for RRC_Idle. The size of the system information varies depending on optional information elements. In order to make use of the existing Transport Block Size (TBS) definitions, it is beneficial that the TBS to be supported on BCCH is chosen from the already defined TBS table. A 3 bit MCS field indicates the following TBS: TBS={264, 392, 520, 648, 776, 904, 1032, 1224}. As shown, various resource blocks can be provided in the format 400 that support the BCCH and other structures described below.

The data format 400 can also include an RACH Response field. The size of the MAC Random Access Response for a random access preamble is 7 bytes (56 bits), and one RACH Response message should support up to 8~16 MAC Random Access Responses. A one byte back-off indication may optionally be present. Since the back-off indication will not be transmitted frequently, the TBS can be based on multiples of 7 bytes. When the back-off indication is transmitted, padding can be carried out.

Regarding the number of MAC Random Access Responses per RACH Response message, although supporting a larger number of MAC Random Access Responses is beneficial in case of high RACH utilization, this can cause a larger number of signaling bits or more padding loss. On the other hand, supporting a lower number of MAC Random Access Responses could cause an increase of the number of PDCCHs. Up to 8 MAC Random Access Responses can be supported as a suitable tradeoff between signaling overhead and padding loss. Note that multiple RACH Response messages can occur in reply to random access preambles from different subframes are transmitted in a single subframe within the time window. In this case more than 8 MAC Random Access Responses can be indicated by using multiple PDCCHs. Therefore, a 3 bit MCS field indicating 1-8 MAC Random Access Responses can be provided (0-7 when back-off indication is transmitted). The TBS size is as follows.

TBS={56, 112, 168, 224, 280, 336, 392, 448}. Since the size of a MAC Random Access Response does not vary, the TBS values should be defined to avoid unnecessary padding (except adding the back-off indication). The proposed values are aligned with the available Quadratic Permutation Polynomial (QPP) inter-leaver sizes.

In another aspect, the data packet 400 can include paging channels. The following example message sizes can be employed:

TABLE 1

Paging message size

| Field | Number of Bits |
| --- | --- |
| UE-ID | 40 bits (S-TMSI) |
|  | ~60 bits (IMSI) |
| Paging cause | 3 bits |
| Paging record list | 3 bits |
| System Info Modification (optional) | 4-5 bits |

The total number of bits per UE can be 50-70 depending on the UE-ID type (S-TMSI or IMSI). Since the size of paging message varies, similar TBS values can be employed to the RACH Response message in order to minimize the UE complexity. The TBS sizes are as follows: TBS={56, 112, 168, 224, 280, 336, 392, 448}.

Figure 5:
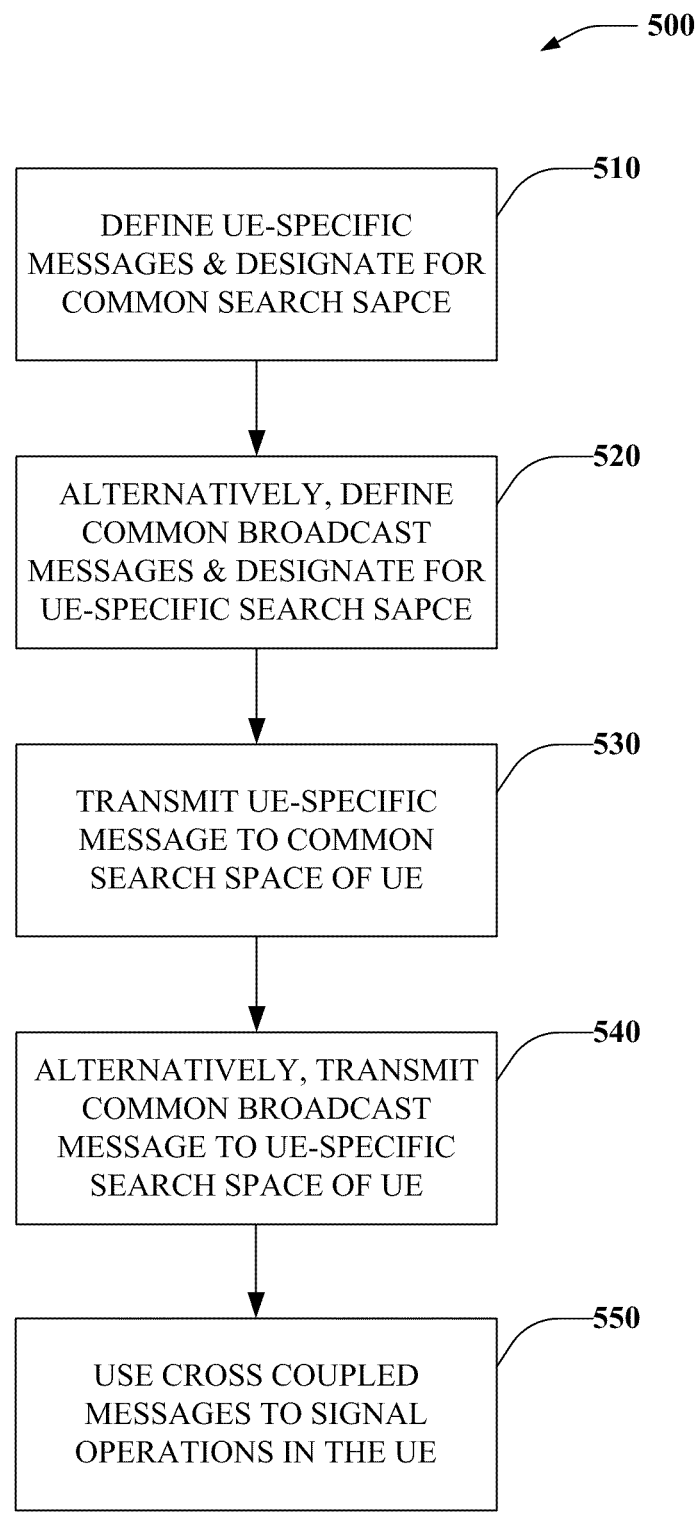
FIG. 5 illustrates a wireless communications method that employs an encapsulation protocol for signaling control.

Referring now to FIG. 5, a wireless communications methodology 500 is illustrated. While, for purposes of simplicity of explanation, the methodology (and other methodologies described herein) are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Proceeding to 510, UE-specific messages are defined and designated for a common broadcast search space. As noted previously, the UE message can be encapsulated by and/or transported by common broadcast protocol. At 520, an alternative aspect defines a common broadcast message in accordance and designates such messages for a UE-specific search space. At 530, the ULE-specific message is transmitted to the common broadcast search space of the UE. Alternatively at 540, the common broadcast message can be transmitted to the UE-specific search space of the UE. At 550, if a cross-couple message is received, for example UE message to common space or common message to UE-specific space, then the UE can be alerted that a desired operation or other routine is to be performed. In one example, the UE may determine that is should resynchronize with the base station. After resynchronizing, the UE can receive data via available downlink channels and protocols.

The techniques described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 6:
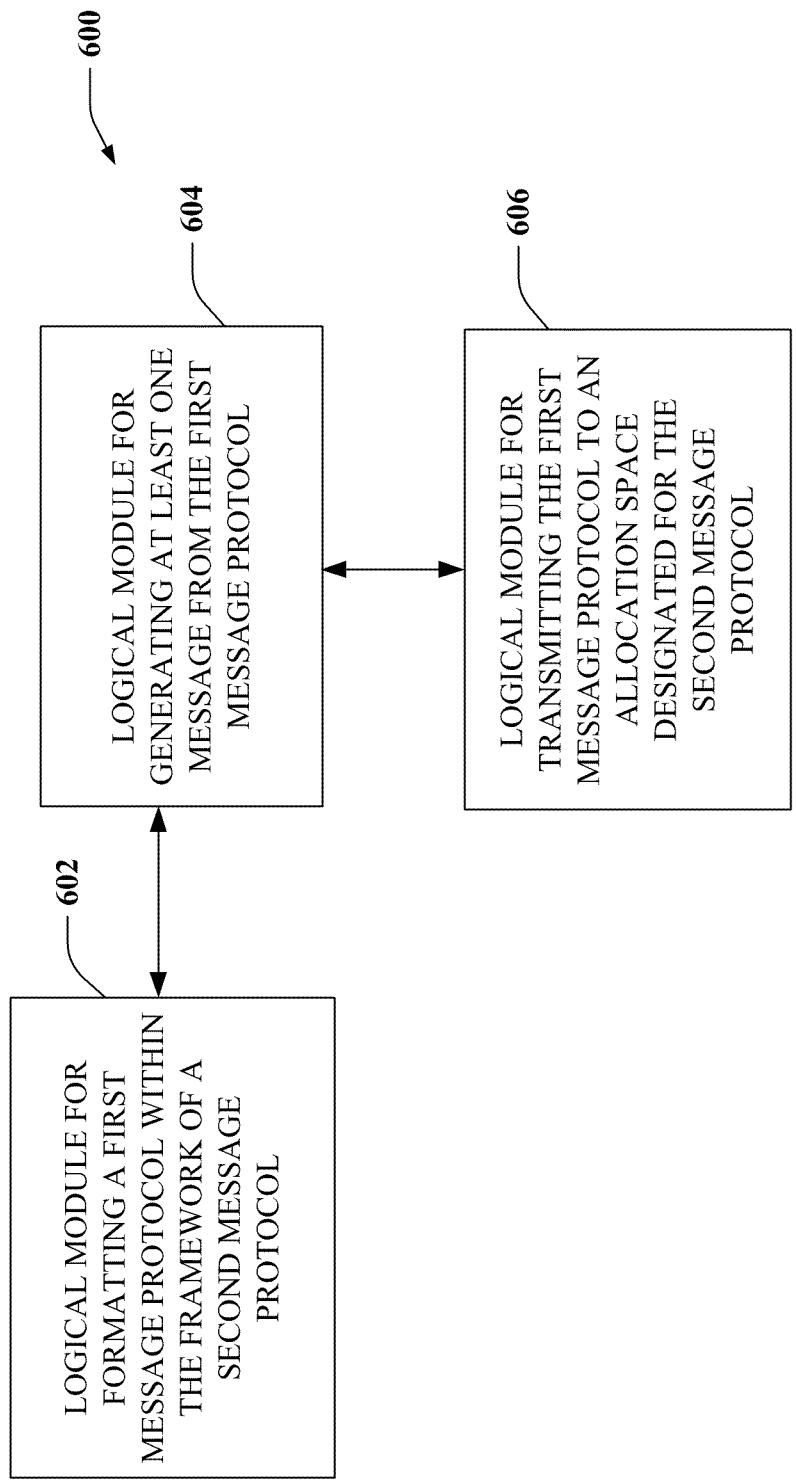
FIG. 6 illustrates an example logical module for a wireless protocol.
Figure 7:
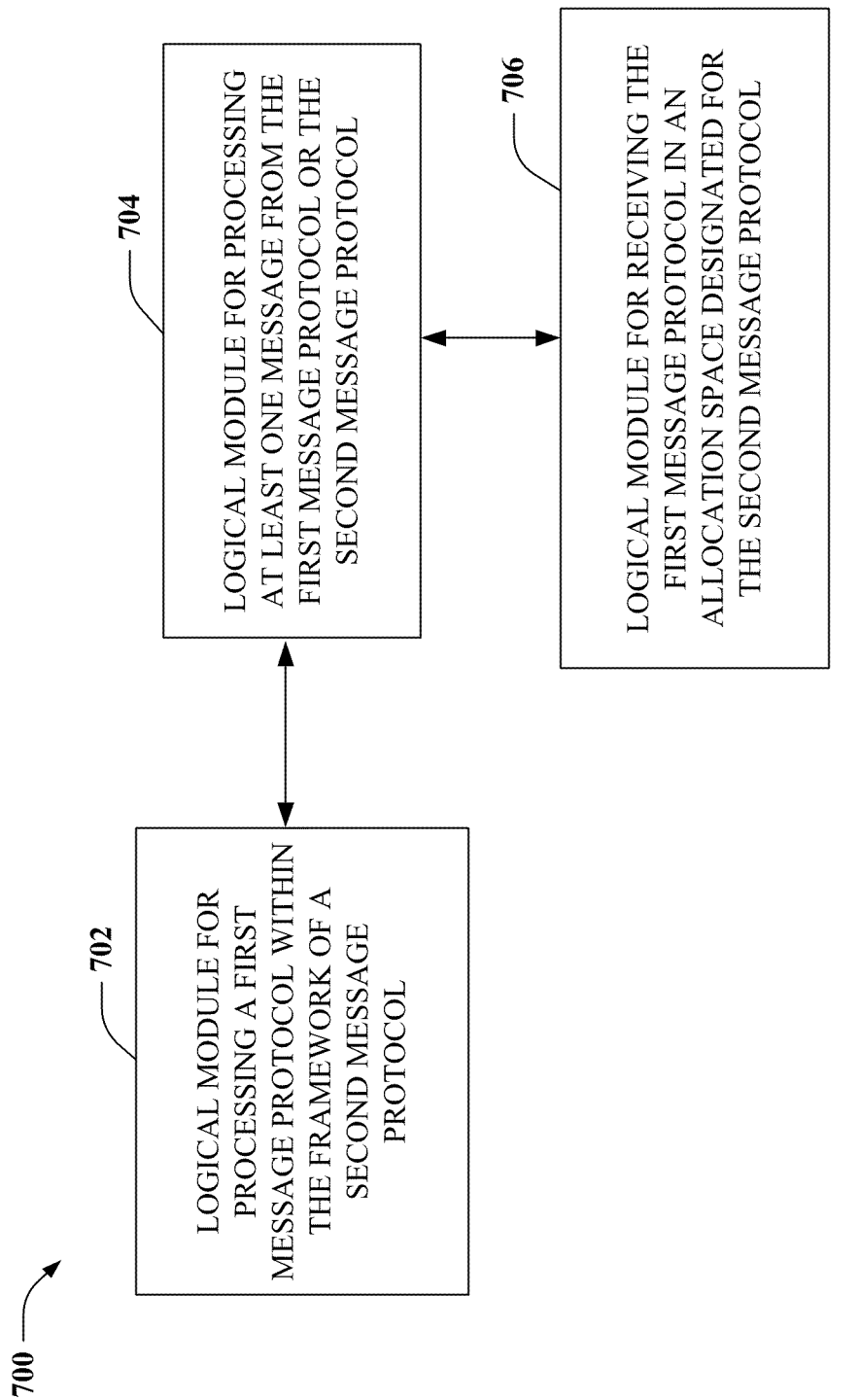
FIG. 7 illustrates an example logical module for an alternative wireless protocol.

Turning now to FIGS. 6 and 7, a system is provided that relates to wireless signal processing. The systems are represented as a series of interrelated functional blocks, which can represent functions implemented by a processor, software, hardware, firmware, or any suitable combination thereof.

Referring to FIG. 6, a wireless communication system 600 is provided. The system 600 includes a logical module 602 for means for formatting a first message protocol within the framework of a second message protocol and a logical module 604 for generating at least one message from the first message protocol. The system 600 also includes a logical module 606 for transmitting the first message protocol to an allocation space designated for the second message protocol.

Referring to FIG. 7, a wireless communication system 700 is provided. The system 700 includes a logical module 702 for processing a first message protocol within the framework of a second message protocol and a logical module 704 for processing at least one message from the first message protocol or the second message protocol. The system 700 also includes a logical module 706 for receiving the first message protocol in an allocation space designated for the second message protocol.

Figure 8:
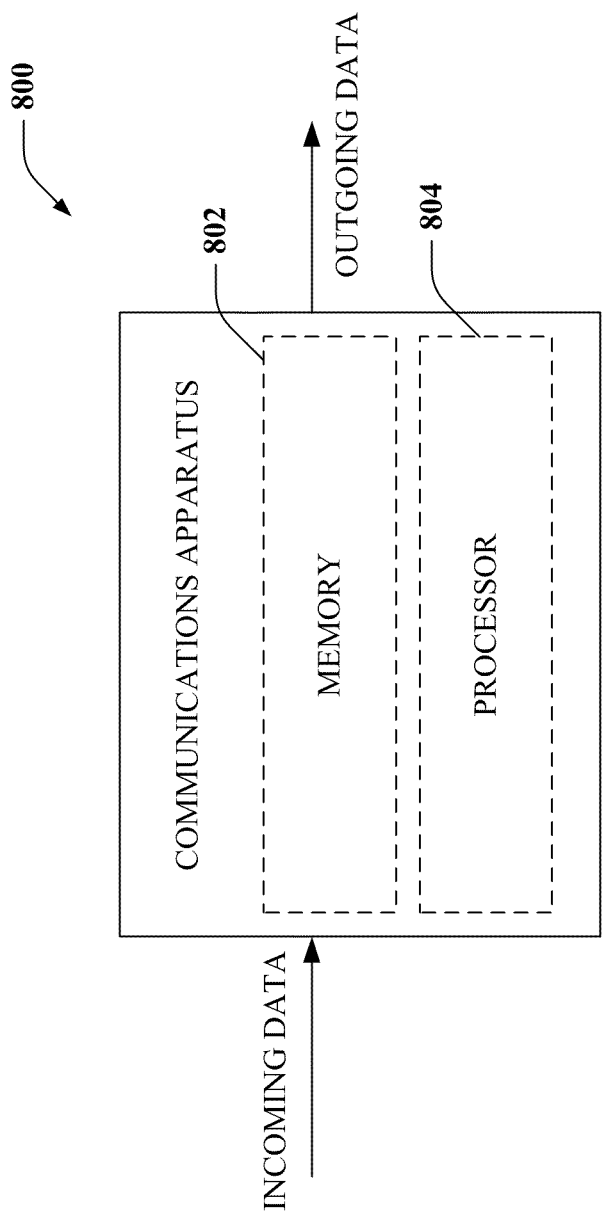
FIG. 8 illustrates an example communications apparatus that employs an encapsulated wireless protocol.

FIG. 8 illustrates a communications apparatus 800 that can be a wireless communications apparatus, for instance, such as a wireless terminal. Additionally or alternatively, communications apparatus 800 can be resident within a wired network. Communications apparatus 800 can include memory 802 that can retain instructions for performing a signal analysis in a wireless communications terminal. Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
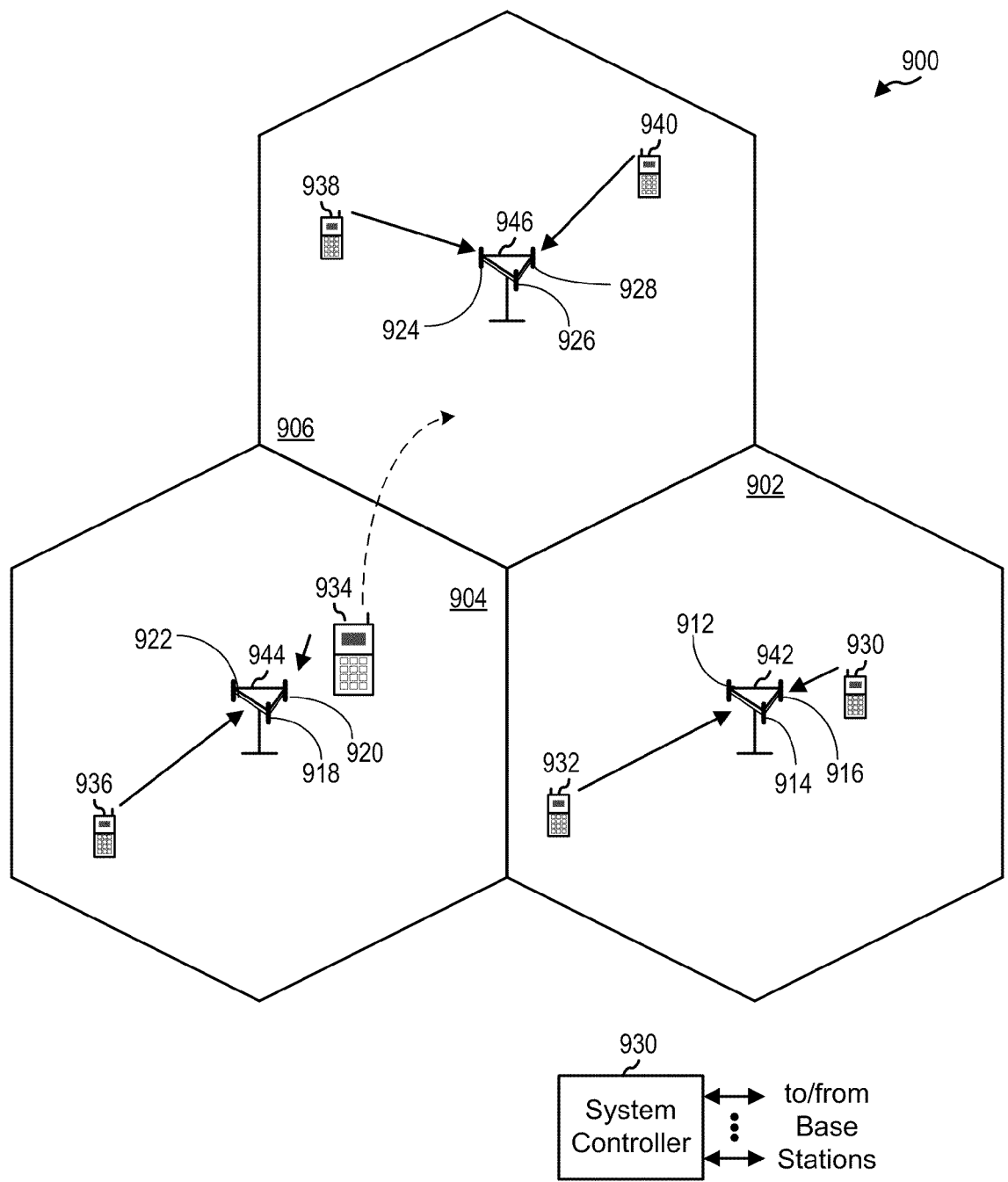
FIG. 9 illustrates a multiple access wireless communication system.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Figure 10:
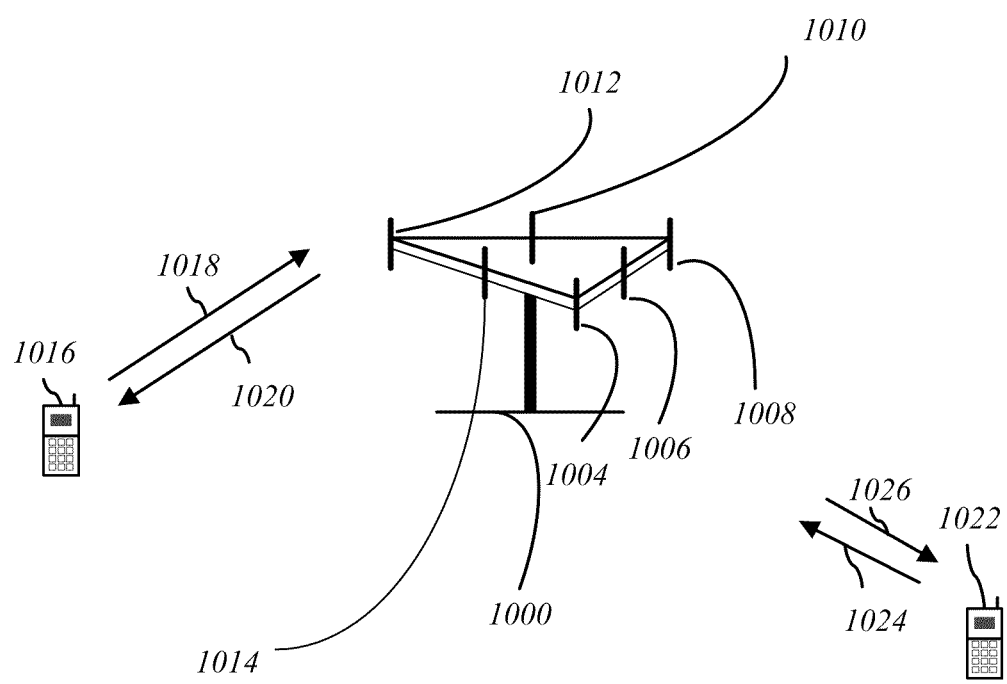
FIGS. 10 and 11 illustrate example communications systems.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
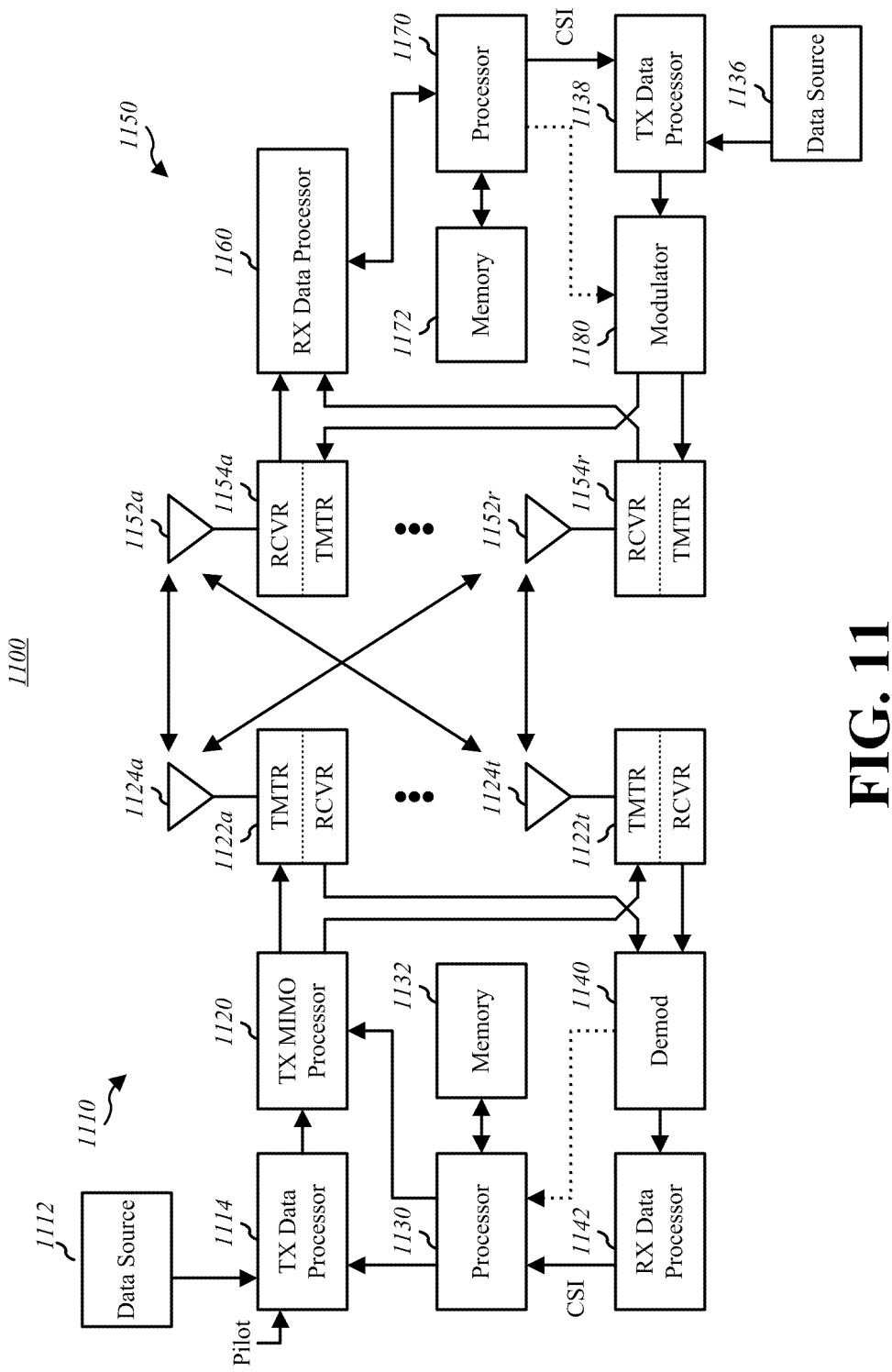

Referring to FIG. 11, a system 1100 illustrates a transmitter system 210 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bidirectional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH), Synchronization Channel (SCH), Common Control Channel (CCCH), Shared DL Control Channel (SD-CCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH), for example.

The UL PHY Channels comprises: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH), for example.

Other terms/components include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method to generate messages for wireless communications, comprising:
   encapsulating a first message protocol within a framework of a second message protocol;
   generating a message from the first message protocol and the second message protocol; and
   signaling a downlink operation by transmitting the first message protocol in a resource search space of the second message protocol without using an additional bit to signal the operation, wherein the encapsulated first message protocol being in the resource search space of the second message protocol signals the downlink operation; and
   receiving a signaled uplink operation by receiving the second message protocol in a resource search space of the first message protocol without using an additional bit to signal the uplink operation, wherein the encapsulated second message protocol being in the resource search space of the first message protocol signals the uplink operation.

2. The method of claim 1, wherein the first message protocol is associated with a user equipment specific search space and the second message protocol is associated with a common search space.

3. The method of claim 1, wherein the first message protocol is associated with a common search space and the second message protocol is associated with a user equipment specific search space.

4. The method of claim 1, wherein at least one of the downlink operation or uplink operation is a resynchronization between the base station and the user equipment.

5. The method of claim 1, wherein the message is transmitted as part of a Physical Downlink Control Channel (PDCCH) protocol.

6. The method of claim 5, wherein the message is generated to indicate that downlink data is ready to be sent from the base station to the user equipment.

7. The method of claim 6, wherein the message includes an access preamble.

8. The method of claim 6, wherein the message includes an allocated time location for frequency division duplex (FDD) and time division duplex (TDD).

9. The method of claim 6, wherein the message includes an allocated frequency location for TDD.

10. The method of claim 6, wherein the message includes an allocated offset to an initial transmission power.

11. The method of claim 10, further comprising performing a contention free access or a contention-based random access.

12. The method of claim 6, wherein the message includes a broadcast control channel field.

13. The method of claim 12, further comprising processing one or more resource blocks.

14. The method of claim 6, wherein the message includes a random access channel field.

15. The method of claim 6, wherein the message includes a paging field.

16. A communications apparatus, comprising:
means for formatting a first message protocol within a framework of a second message protocol;
means for generating at least one message from the first message protocol; and
means for signaling a downlink operation between a base station and a user equipment by transmitting the first message protocol in a resource search space of the second message protocol without using an additional bit to signal the operation, wherein the first message protocol being within the resource search space of the second message protocol signals the downlink operation and
means for receiving a signaled uplink operation by receiving the second message protocol in a resource search space of the first message protocol without using an additional bit to signal the uplink operation, wherein the encapsulated second message protocol being in the resource search space of the first message protocol signals the uplink operation.

17. A method to process messages for wireless communications, comprising:
processing a first message protocol within a framework of a second message protocol;
processing a message from the first message protocol and the second message protocol; and
receiving the first message protocol in a resource search space designated for the second message protocol, the first message protocol being in the resource search space of the second message protocol signals a downlink operation without using an additional bit to signal the downlink operation; and
signaling the second message protocol in a resource search space designated for the first message protocol, the second message protocol being in the resource search space of the first message protocol signals an uplink operation without using an additional bit to signal the uplink operation.

18. The method of claim 17, wherein the first message protocol is associated with a user equipment specific search space and the second message protocol is associated with a common search space.

19. The method of claim 17, wherein the first message protocol is associated with a common search space and the second message protocol is associated with a user equipment specific search space.

* * * * *